United States Patent [19]

Artun et al.

[11] Patent Number: 4,644,567
[45] Date of Patent: Feb. 17, 1987

[54] CIRCUIT ARRANGEMENT FOR SYNCHRONIZING OF CLOCK-SIGNAL GENERATED AT A RECEIVING STATION WITH CLOCK-SIGNALS RECEIVED IN TELECOMMUNICATIONS SYSTEMS WITH DIGITAL TRANSMISSION OF INFORMATION

[76] Inventors: Berkan Artun, Landwehrstrasse 6, D 6100 Darmstadt; Helmut Goy, Am Lindenbaum 13, D 6969 Nidderau 1, both of Fed. Rep. of Germany

[21] Appl. No.: 767,478

[22] Filed: Aug. 20, 1985

[30] Foreign Application Priority Data

Aug. 27, 1985 [DE] Fed. Rep. of Germany ....... 3431419

[51] Int. Cl.⁴ ............................................. H04L 7/00
[52] U.S. Cl. .................................. 375/108; 375/119; 375/120
[58] Field of Search .................... 375/8, 82, 106, 108, 375/111, 113, 120; 328/62, 63, 133, 134, 155, 206, 207; 331/1 A, 1 R; 307/514, 527

[56] References Cited

U.S. PATENT DOCUMENTS

| | | | |
|---|---|---|---|
| 3,813,604 | 5/1974 | Denoncourt | 307/527 |
| 4,151,485 | 4/1979 | LaFratta | 375/108 |
| 4,371,974 | 2/1983 | Dugan | 375/82 |
| 4,380,815 | 4/1983 | Clendening | 375/81 |
| 4,516,250 | 5/1985 | Grimes | 375/82 |
| 4,520,319 | 5/1985 | Baker | 307/514 |
| 4,535,459 | 8/1985 | Hogge, Jr. | 331/1 A |
| 4,543,661 | 9/1985 | Defevilly et al. | 331/1 A |
| 4,569,063 | 2/1986 | Perry | 375/82 |

Primary Examiner—Robert L. Griffin
Assistant Examiner—Stephen Chin
Attorney, Agent, or Firm—Jacobson and Johnson

[57] ABSTRACT

The inventive circuit arrangement effects that a too wide adjustable deceleration of a clock generator is prevented, if gaps occur in a received signal, and that possible adjustment faults are compensated immediately when the receiving signal appears again. Thus the phase relation of the clock generator is adjusted to the phase of the received signal very soon.

6 Claims, 2 Drawing Figures

CIRCUIT ARRANGEMENT FOR SYNCHRONIZING OF CLOCK-SIGNAL GENERATED AT A RECEIVING STATION WITH CLOCK-SIGNALS RECEIVED IN TELECOMMUNICATIONS SYSTEMS WITH DIGITAL TRANSMISSION OF INFORMATION

FIELD OF THE INVENTION

This application relates generally to a circuit arrangement for synchronizing of a clock signal generated at a receiving station with clock signals received in telecommunications systems with digital transmission of information.

BACKGROUND OF THE INVENTION

When digital binary-coded information is transmitted, one task is to obtain the transmitting clock of the distant data source at the receiving station with same frequency and phase relation. Ony then it is possible to scan the received data in the middle of the sign for obtaining their information for further handling and computing with a definite clock timing. A synchronization can also be achieved by transmitting additional synchronizing signals together with the binary-coded signals containing the information. But the number of signs which must be transmitted is increased which might cause the need of a higher transmission speed.

Therefore it is more reasonable to obtain criteria for synchronizing out of the data themselves as it is known from German Patent Application No. DE-AS 12 87 609. The method described therein and the means for step-synchronisation in synchronous transmitting systems provide a control circuit which is feeded with a higher or a lower frequency in depence of the phase relation between the received signal and a frequency generated by a clock generator for controlling a divider chain. Therefore means for generating comparison pulses are provided by which the control unit is switched over to higher frequency when a comparison pulse occurs. The higher frequency is thereby directly generated by a frequency generator and the lower frequency is obtained by a bistable divider. Normally the lower frequency is applied to the clock divider chain, and only if a regulation is necessary the higher frequency is switched to said control circuit. Then the stepping of the divider chain is speeded up whereby the phase relation is changed positively. Pulses of half the frequency are applied to the divider chain for delaying the phase relation when a comparison pulse occurs again.

By this known method the synchronisation is done totally digital whereby the clock generator itself is not influenced. Therefore a synchronisation is possible only by steps which are given by the clock frequency and the double frequency which is generated by the frequency generator. Moreover the output signal of the arrangement could be changed in an undue way if the received signal contains gaps, because the actions of synchronisation cannot be stopped in time.

SUMMARY OF THE INVENTION

The task of this invention is to provide a circuit arrangement for achieving direct influence to a clock generator at a receiving station, whereby a fast reacting synchronisation is also obtained when received signals are full of gaps.

This task is solved by a combination of features as it is described in claim 1. The advantage of this is that the synchronisation action is not continued for any time but interrupted in time when gaps within the received signal occur, and that an existing fault is compensated as soon as the receiving signal appears again. Further advancements are shown in subsequent claims.

DESCRIPTION OF THE PREFERRED EMBODIMENT

The input signal ES is applied to a monostable flip flop MF which generates a pulse of definite length at every positive pulse edge. When this pulse Te is applied to the input of the first flip flop FF1 before the reset pulse coming from the divider TT and generated by the clock generator TG is given to said flip flop FF1 it will be changed into its active position. By OR-gate G1 it is prevented that the second flip flop FF2 can be set. The output signal Q of flip flop FF1 is switched to transistor T1 which operates causing an increase of the control voltage UR for the clock generator TG thus achieving an increase of the output frequency. Thereby the phase relation of the frequency generated at the receiving station is adjusted to the phase of the received signal. The pulse diagrams in FIG. 2 show that gate G4 has always an output signal when flip flop FF1 is in its active position.

The first flip flop FF1 is forced to reset when the output of the clock divider TT supplies a positive signal. Thus it is in its active position as long as the positive edge of the input signal ES is ahead of the pulse edge of the same kind coming from the clock divider TT. But if the positive edge of clock Tf from divider TT appears before the edge of the input signal ES the second flip flop FF2 is turned to its active position and it is prevented that the first flip flop FF1 can come to its active position as long as the pulse Tf coming from the clock divider TT is positive. When the monostable flip flop MF generates a pulse Te caused by a positive pulse edge of the input signal ES, the second flip flop FF2 is turned back into its inactive position.

Figure 1:
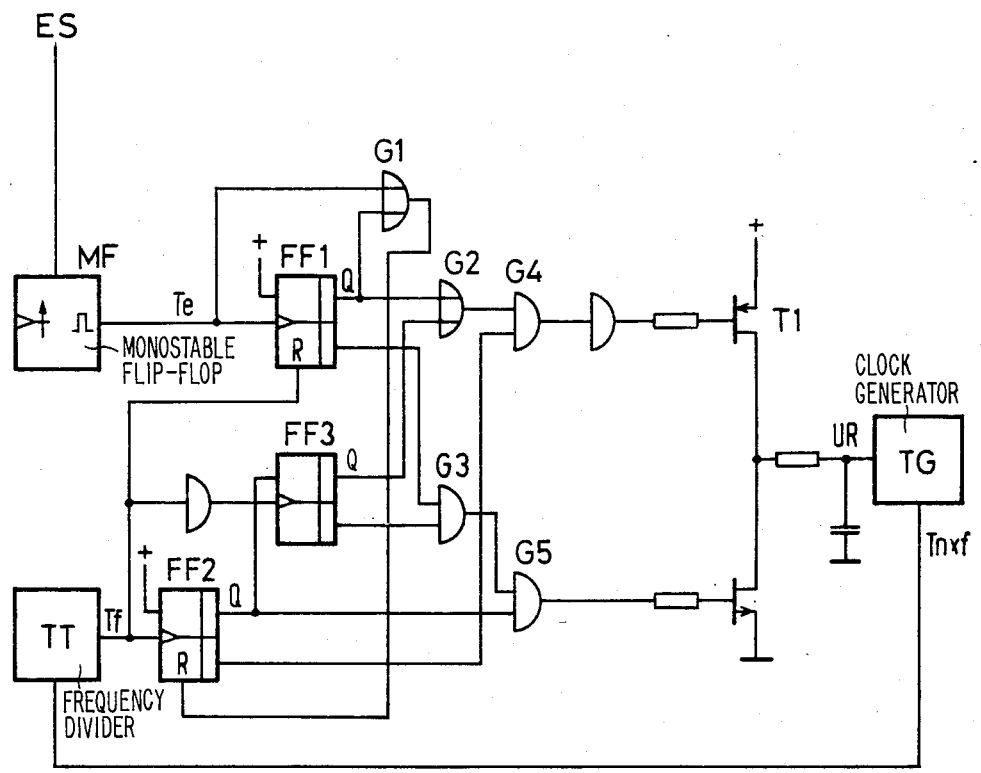
FIG. 1 shows the diagram of the circuit arrangement
Figure 2:
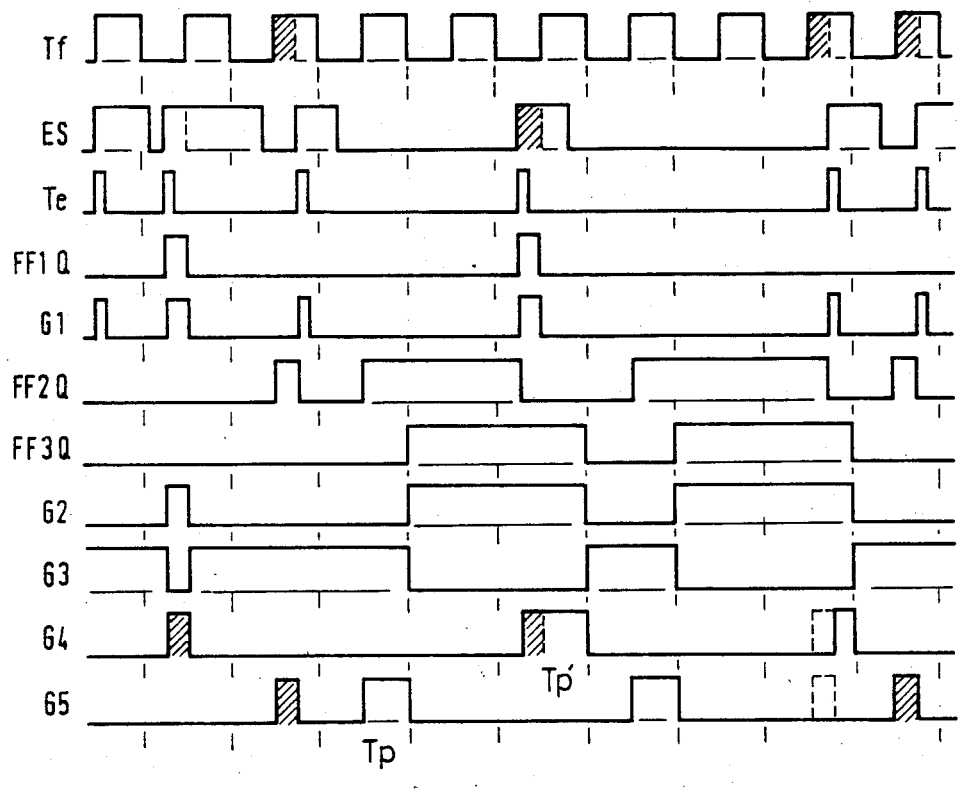
FIG. 2 shows the pulse diagram

While flip flop FF2 is in its active position gate G5 supplies a pulse of equal length, as shown in FIG. 2, thus activating transistor T2 of the voltage switch. The control voltage UR for clock generator TG will be reduced, thus the frequency of clock Tnxf is reduced too. The phase relation of clock generator TG will approach to the phase of the input signal ES too in this case.

When an input signal is full of gaps as shown in the middle of the pulse diagram in FIG. 2 first the second flip flop FF2 is put into its active position because the clock pulse Tf coming from clock divider TT appears earlier than a pulse edge of the input signal ES. If this condition lasts loger than half the clock period of clock divider TT the third flip flop FF3 is activated too, because the second flip flop FF2 is already in its active position and the inverted pulse edge of clock Tf from clock divider TT occurs. This condition is kept up until the input signal appears again. When flip flops FF2 and FF3 are both in their active positions, both gates G4 and G5 are cut off, thus both transistors T1 and T2 of the voltage switch are inactivated, and the control voltage UR remains at the same level as adjusted before. This condition is as well kept up until appearance of the input signal ES.

As shown in FIG. 2 gate G5 supplies a pulse for half the length of the pulse period of the clock Tf coming from clock divider TT, when the input signal is absent, because the third flip flop FF3 is activated later for this time. Thus the control voltage UR is adjusted too low for the same time. This fault is compensated as soon as the input signal ES appears by switching off the third flip flop FF3 half a clock period later than inactivating the second flip flop FF2 thereby opening the first transistor of the voltage switch via the gates G2 and G4 longer for the same time, thus causing an increase of the control voltage UR to the same value as decreased too much before.

If the phase relation of the received pulse Te is only little ahead of the clock Tf coming from clock divider TT, when the input signal ES appears again, the second flip flop FF2 is activated and the positive control pulse for control voltage UR is cut off via gate G4. Criteria of this kind are shown in FIG. 2 at the end of the pulse diagrams.

By this circuit arrangement the phase relation of the clock generator TG is adjusted to the phase of the input signal ES very soon when the input signal appears again after a gap.

It is claimed:

1. In a digital data telecommunication system, a circuit arrangement for synchronizing the clock pulse signal generated at a receiving station with the received data signal, comprising:

a first (FF1) and a second (FF2) bistable flip-flop each having a set input and a reset (R) input responsive to an edge of a pulse signal and each having a respectively corresponding set output (Q) and reset output;

a monostable flip-flop (MF) for producing a fixed width output pulse (Te) in response to the leading edge of a received clock and data pulse signal (ES);

a clock pulse generator (TG) for generating a clock pulse signal;

means for feeding in part a clock pulse signal (Tf) from said clock pulse generator to the set input of said second bistable flip-flop and to the reset input of said first bistable flip-flop;

first logical circuit means coupled to the set output (FF1Q) of said first flip-flop for changing the clock pulse generator control voltage to increase the frequency of said clock pulse generator signal;

second logical circuit means coupled to the set output (FF2Q) of said second flip-flop for changing the clock pulse generator control voltage to decrease the frequency of said clock pulse generator signal;

third logical circuit means coupled to the output of said monostable flip-flop for setting said first flip-flop and for preventing the generated clock pulse signal from setting said second flip-flop when the received clock and data pulse signal is earlier in phase relationship to the generated clock pulse signal and for preventing the setting of said first flip-flop and permitting the generated clock signal to set the second flip-flop when the received clock and data pulse signal is later in phase relationship to the generated clock pulse signal;

a third bistable flip-flop (FF3) having a set and a reset input responsive to an edge of a pulse signal and having a respectively corresponding set output (FF3Q) and a reset output;

fourth logical circuit means coupled to the outputs of said third flip-flop for preventing said first and second logical circuit means from changing the clock pulse generator control voltage to thereby prevent change in the frequency of said clock pulse generator signal when said third flip-flop is in the set condition; and fifth circuit means coupled to the set and reset inputs of said third flip-flop for setting said third flip-flop and holding it set during a prolonged gap in the received signal (ES).

2. The invention as described in claim 1 wherein said first logical circuit means includes:

a first "and" gate responsive to the set output of said first flip-flop and to the reset output of said second flip-flop, the output of said "and" gate controlling in part the clock pulse generator control voltage.

3. The invention as described in claim 2 wherein said second logical circuit means includes:

a second "and" gate responsive to the set output of said second flip-flop, the output of said second "and" gate controlling in part the clock pulse generator control voltage.

4. The invention as described in claim 3 wherein said third logical circuit means includes:

means for connecting the output of said monostable flip-flop to the set input of said first flip-flop; and a first "or" gate having one input connected to the output of said monostable flip-flop and another input connected to the set output of said first flip-flop and its output connected to the reset input of said second flip-flop.

5. The invention as in claim 4 wherein said fourth logical circuit means includes:

a second "or" gate, one input of said second "or" gate connected to the set output of said first flip-flop and another input connected to the set output of said third flip-flop, the output of said second "or" gate connected to the input of said first "and" gate; and a third "and" gate, one input of said third "and" gate connected to the reset output of said third flip-flop and another input connected to the reset output of said first flip-flop, the output of said third "and" gate connected to the input of said second "and" gate.

6. In a digital data telecommunication system having a clock pulse signal generator at a receiving station, first and a second bistable flip-flops responsive at least in part to a received signal and to the clock signal, and logical circuits responsive to said pair of flip-flops for synchronizing the phase relationship between the clock signal frequency and the frequency of the received digital signal by changing the frequency of the clock generator signal, the improvement, comprising:

a third bistable flip-flop (FF3) having a set and a reset input responsive to an edge of a pulse signal and having a respectively corresponding set output (FF3Q) and reset output;

logical circuit means coupled between said set and reset outputs of said third flip-flop and the logical circuits responsive to said pair of flip-flops for preventing any change in the frequency of the clock generator signal when said third flip-flop is in the set condition; and circuit means coupled to the set and reset inputs of said third flip-flop for setting and holding said third flip-flop in the set condition during a prolonged gap in the received signal.

\* \* \* \* \*